United States Patent
Kirk et al.

(10) Patent No.: US 10,776,622 B2
(45) Date of Patent: Sep. 15, 2020

(54) ACTIVE STEREO WITH ADAPTIVE SUPPORT WEIGHTS FROM A SEPARATE IMAGE

(71) Applicant: Microsoft Technology Licensing, LLC, Redmond, WA (US)

(72) Inventors: Adam G. Kirk, Renton, WA (US); Christoph Rhemann, Cambridge (GB); Oliver A. Whyte, Seattle, WA (US); Shahram Izadi, Cambridge (GB); Sing Bing Kang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 575 days.

(21) Appl. No.: 13/924,464

(22) Filed: Jun. 21, 2013

(65) Prior Publication Data
US 2014/0307047 A1    Oct. 16, 2014

Related U.S. Application Data

(60) Provisional application No. 61/812,232, filed on Apr. 15, 2013.

(51) Int. Cl.
*G06K 9/00* (2006.01)
*H04N 5/33* (2006.01)
(Continued)

(52) U.S. Cl.
CPC .......... *G06K 9/00536* (2013.01); *B29C 64/00* (2017.08); *B29C 64/386* (2017.08);
(Continued)

(58) Field of Classification Search
CPC .............. A63F 13/213; B29C 67/0051; G01B 11/2513; G01B 11/2545; G02B 27/4205;
(Continued)

(56) References Cited

U.S. PATENT DOCUMENTS 3,938,102 A    2/1976 Morrin et al.
5,351,152 A    9/1994 Kuo et al.
(Continued)

FOREIGN PATENT DOCUMENTS

CN    1244008 A    2/2000
CN    1414412 A    4/2003
(Continued)

OTHER PUBLICATIONS

Chan et al., "Regular Stereo Matching Improvement System Based on Kinect-Supporting Mechanism", Open Journal of Applied Sciences, Mar. 22-26, 2013.*
(Continued)

*Primary Examiner* — James T Boylan

(57) ABSTRACT

Systems and methods for stereo matching based upon active illumination using a patch in a non-actively illuminated image to obtain weights that are used in patch similarity determinations in actively illuminated stereo images is provided. To correlate pixels in actively illuminated stereo images, adaptive support weights computations are used to determine similarity of patches corresponding to the pixels. In order to obtain adaptive support weights for the adaptive support weights computations, weights are obtained by processing a non-actively illuminated ("clean") image.

20 Claims, 7 Drawing Sheets

(51) Int. Cl.

| | | |
|---|---|---|
| G06K 9/62 | (2006.01) | |
| G06F 11/30 | (2006.01) | |
| G06F 3/06 | (2006.01) | |
| G06F 9/30 | (2018.01) | |
| G06F 12/02 | (2006.01) | |
| G06F 12/00 | (2006.01) | |
| B29C 64/386 | (2017.01) | |
| H04N 13/128 | (2018.01) | |
| H04N 13/25 | (2018.01) | |
| H04N 13/254 | (2018.01) | |
| H04N 13/271 | (2018.01) | |
| G06T 7/586 | (2017.01) | |
| H04N 5/225 | (2006.01) | |
| H04N 9/04 | (2006.01) | |
| H04N 17/00 | (2006.01) | |
| G01B 11/25 | (2006.01) | |
| G06T 1/60 | (2006.01) | |
| B29C 64/00 | (2017.01) | |
| H04N 13/239 | (2018.01) | |
| G02B 27/42 | (2006.01) | |
| G02B 5/18 | (2006.01) | |
| G02B 27/44 | (2006.01) | |
| G01B 11/22 | (2006.01) | |
| G06T 7/00 | (2017.01) | |
| H04N 13/00 | (2018.01) | |
| A63F 13/213 | (2014.01) | |

(52) U.S. Cl.
CPC .............. *G01B 11/22* (2013.01); *G01B 11/25* (2013.01); *G01B 11/2513* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 3/0653* (2013.01); *G06F 3/0659* (2013.01); *G06F 3/0683* (2013.01); *G06F 9/3004* (2013.01); *G06F 9/30043* (2013.01); *G06F 9/30127* (2013.01); *G06F 11/3024* (2013.01); *G06F 12/00* (2013.01); *G06F 12/02* (2013.01); *G06F 12/0207* (2013.01); *G06F 12/0292* (2013.01); *G06K 9/0063* (2013.01); *G06K 9/00201* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/045* (2013.01); *H04N 13/128* (2018.05); *H04N 13/239* (2018.05); *H04N 13/25* (2018.05); *H04N 13/254* (2018.05); *H04N 13/271* (2018.05); *H04N 17/002* (2013.01); *A63F 13/213* (2014.09); *G02B 27/4233* (2013.01); *G06T 2207/30244* (2013.01); *H04N 2013/0081* (2013.01)

(58) Field of Classification Search
CPC ............ G06F 12/0207; G06K 9/00536; G06T 7/0073; H04N 13/0022; H04N 13/0239; H04N 13/025; H04N 13/0253; H04N 13/0271; H04N 17/002; H04N 2013/0081; H04N 5/2256; H04N 5/33; H04N 5/332
USPC ........................................................ 348/42
See application file for complete search history.

(56) References Cited

U.S. PATENT DOCUMENTS

| | | |
|---|---|---|
| 5,471,326 A | 11/1995 | Hall et al. |
| 5,586,200 A | 12/1996 | Devaney et al. |
| 5,739,906 A | 4/1998 | Evans et al. |
| 6,105,139 A | 8/2000 | Dey et al. |
| 6,751,344 B1 | 6/2004 | Grumbine |
| 7,315,383 B1 | 1/2008 | Abdollahi |
| 7,512,262 B2 | 3/2009 | Criminisi et al. |
| 7,565,003 B2 | 7/2009 | Ashizaki et al. |
| 7,634,395 B2 | 12/2009 | Flandrin et al. |
| 8,077,034 B2 | 12/2011 | Borlez et al. |
| 8,331,654 B2 | 12/2012 | Abraham et al. |
| 8,442,940 B1 | 5/2013 | Faletti et al. |
| 8,787,656 B2* | 7/2014 | Park .................. G06T 7/0071 382/154 |
| 8,818,077 B2* | 8/2014 | Hwang ............... G06T 7/0075 382/154 |
| 9,508,003 B2 | 11/2016 | Eguro et al. |
| 9,697,424 B2 | 7/2017 | Kirk et al. |
| 9,760,770 B2 | 9/2017 | Eguro et al. |
| 9,922,249 B2 | 3/2018 | Kang et al. |
| 9,928,420 B2 | 3/2018 | Kirk et al. |
| 9,959,465 B2 | 5/2018 | Georgiou et al. |
| 2002/0136444 A1 | 9/2002 | Brown et al. |
| 2003/0043270 A1 | 3/2003 | Rafey et al. |
| 2003/0048459 A1 | 3/2003 | Gooch |
| 2003/0081833 A1 | 5/2003 | Tilton |
| 2004/0105580 A1 | 6/2004 | Hager et al. |
| 2004/0125222 A1 | 7/2004 | Bradski et al. |
| 2004/0201586 A1 | 10/2004 | Marschner et al. |
| 2005/0058362 A1* | 3/2005 | Kita ............................ 382/254 |
| 2005/0234527 A1 | 10/2005 | Slatkine |
| 2005/0257748 A1 | 11/2005 | Kriesel et al. |
| 2005/0279172 A1 | 12/2005 | Schreier et al. |
| 2006/0176306 A1 | 8/2006 | Nagaraj et al. |
| 2006/0210146 A1* | 9/2006 | Gu ..................... G01B 11/25 382/154 |
| 2006/0238714 A1* | 10/2006 | Fox .................. G06K 9/00791 352/49 |
| 2006/0291020 A1 | 12/2006 | Knox et al. |
| 2007/0009150 A1 | 1/2007 | Suwa et al. |
| 2007/0145273 A1 | 6/2007 | Chang |
| 2007/0146512 A1 | 6/2007 | Suzuki et al. |
| 2007/0183657 A1 | 8/2007 | Kidono et al. |
| 2007/0253310 A1 | 11/2007 | Ikenaka |
| 2007/0263903 A1 | 11/2007 | St. hilaire et al. |
| 2008/0118143 A1 | 5/2008 | Gordon et al. |
| 2008/0130015 A1 | 6/2008 | Lu |
| 2008/0165357 A1 | 7/2008 | Stern et al. |
| 2008/0187711 A1 | 8/2008 | Alam et al. |
| 2008/0205748 A1 | 8/2008 | Lee et al. |
| 2008/0218612 A1 | 9/2008 | Border et al. |
| 2008/0278570 A1 | 11/2008 | Gharib et al. |
| 2008/0283729 A1 | 11/2008 | Hosaka |
| 2009/0021750 A1 | 1/2009 | Korner et al. |
| 2009/0080048 A1 | 3/2009 | Tsao |
| 2009/0096783 A1 | 4/2009 | Shpunt et al. |
| 2009/0217213 A1 | 8/2009 | Meserve |
| 2009/0217214 A1 | 8/2009 | Meserve |
| 2009/0231425 A1 | 9/2009 | Zalewski |
| 2009/0273679 A1 | 11/2009 | Gere et al. |
| 2010/0042964 A1 | 2/2010 | Meserve |
| 2010/0046004 A1 | 2/2010 | Lee et al. |
| 2010/0074532 A1 | 3/2010 | Gordon et al. |
| 2010/0177164 A1 | 7/2010 | Zalevsky et al. |
| 2010/0202725 A1 | 8/2010 | Popovich et al. |
| 2010/0277571 A1 | 11/2010 | Xu et al. |
| 2010/0289885 A1* | 11/2010 | Lu ..................... H04N 5/2258 348/61 |
| 2011/0025827 A1 | 2/2011 | Shpunt et al. |
| 2011/0063427 A1* | 3/2011 | Fengler ............. A61B 1/00186 348/65 |
| 2011/0078189 A1 | 3/2011 | Bonchi et al. |
| 2011/0080487 A1 | 4/2011 | Venkataraman et al. |
| 2011/0091096 A1 | 4/2011 | Morris et al. |

(56) References Cited

U.S. PATENT DOCUMENTS

| | | |
|---|---|---|
| 2011/0103711 A1 | 5/2011 | Su et al. |
| 2011/0149031 A1* | 6/2011 | Um .................... H04N 13/0011 348/43 |
| 2011/0222757 A1* | 9/2011 | Yeatman, Jr. ........ H04N 13/239 382/154 |
| 2011/0228097 A1* | 9/2011 | Motta .................... H04N 5/33 348/164 |
| 2011/0310220 A1 | 12/2011 | Mceldowney |
| 2012/0002045 A1* | 1/2012 | Tony .................... G06K 9/209 348/143 |
| 2012/0025080 A1 | 2/2012 | Liu et al. |
| 2012/0038986 A1 | 2/2012 | Pesach |
| 2012/0056982 A1* | 3/2012 | Katz .................... H04N 13/025 348/43 |
| 2012/0087572 A1 | 4/2012 | Dedeoglu et al. |
| 2012/0120494 A1 | 5/2012 | Takayama |
| 2012/0154397 A1 | 6/2012 | Chernikov et al. |
| 2012/0155747 A1 | 6/2012 | Hwang |
| 2012/0242829 A1 | 9/2012 | Shin et al. |
| 2012/0253201 A1 | 10/2012 | Reinhold |
| 2012/0281087 A1 | 11/2012 | Kruse |
| 2012/0294510 A1 | 11/2012 | Zhang et al. |
| 2012/0307075 A1 | 12/2012 | Margalit |
| 2013/0002814 A1 | 1/2013 | Park et al. |
| 2013/0003069 A1 | 1/2013 | Umeda et al. |
| 2013/0051657 A1 | 2/2013 | Ostermann et al. |
| 2013/0083062 A1 | 4/2013 | Geisner et al. |
| 2013/0095302 A1 | 4/2013 | Pettis et al. |
| 2013/0100256 A1 | 4/2013 | Kirk et al. |
| 2013/0100282 A1 | 4/2013 | Siercks |
| 2013/0141545 A1 | 6/2013 | Macchia et al. |
| 2013/0141611 A1 | 6/2013 | Hirai et al. |
| 2013/0215235 A1 | 8/2013 | Russell |
| 2013/0229396 A1 | 9/2013 | Huebner |
| 2013/0265623 A1 | 10/2013 | Sugiyama et al. |
| 2013/0278631 A1* | 10/2013 | Border ................ G02B 27/017 345/633 |
| 2013/0287291 A1* | 10/2013 | Cho .................... G06K 9/46 382/154 |
| 2013/0335531 A1 | 12/2013 | Lee et al. |
| 2014/0055560 A1 | 2/2014 | Fu et al. |
| 2014/0098342 A1 | 4/2014 | Webb |
| 2014/0104387 A1 | 4/2014 | Klusza et al. |
| 2014/0112573 A1 | 4/2014 | Francis et al. |
| 2014/0120319 A1 | 5/2014 | Joseph |
| 2014/0132501 A1 | 5/2014 | Choi et al. |
| 2014/0132728 A1 | 5/2014 | Verano et al. |
| 2014/0139717 A1* | 5/2014 | Short .................... H04N 7/142 348/333.1 |
| 2014/0168380 A1 | 6/2014 | Heidemann et al. |
| 2014/0180639 A1 | 6/2014 | Cheatham et al. |
| 2014/0184584 A1* | 7/2014 | Reif .................... G06T 7/0075 345/419 |
| 2014/0206443 A1 | 7/2014 | Sharp et al. |
| 2014/0225985 A1 | 8/2014 | Klusza et al. |
| 2014/0225988 A1 | 8/2014 | Poropat |
| 2014/0241612 A1 | 8/2014 | Rhemann et al. |
| 2014/0293011 A1 | 10/2014 | Lohry et al. |
| 2014/0307055 A1 | 10/2014 | Kang et al. |
| 2014/0307057 A1 | 10/2014 | Kang et al. |
| 2014/0307058 A1 | 10/2014 | Kirk et al. |
| 2014/0307098 A1 | 10/2014 | Kang et al. |
| 2014/0307307 A1 | 10/2014 | Georgiou et al. |
| 2014/0307952 A1 | 10/2014 | Sweeney et al. |
| 2014/0307953 A1 | 10/2014 | Kirk et al. |
| 2014/0309764 A1 | 10/2014 | Socha-leialoha et al. |
| 2014/0310496 A1 | 10/2014 | Eguro et al. |
| 2014/0320605 A1 | 10/2014 | Johnson |
| 2014/0354803 A1 | 12/2014 | Chida |
| 2015/0078672 A1 | 3/2015 | Eguro et al. |
| 2015/0316368 A1 | 11/2015 | Moench et al. |
| 2018/0173947 A1 | 6/2018 | Kang et al. |
| 2018/0218210 A1 | 8/2018 | Georgiou et al. |
| 2018/0260623 A1 | 9/2018 | Kang et al. |

FOREIGN PATENT DOCUMENTS

| | | | |
|---|---|---|---|
| CN | 1414420 A | 4/2003 | |
| CN | 1445724 A | 10/2003 | |
| CN | 1541483 A | 10/2004 | |
| CN | 1669051 A | 9/2005 | |
| CN | 1735789 A | 2/2006 | |
| CN | 101061367 A | 10/2007 | |
| CN | 101124514 A | 2/2008 | |
| CN | 101309429 A | 11/2008 | |
| CN | 101443809 A | 5/2009 | |
| CN | 101501442 A | 8/2009 | |
| CN | 101509764 A | 8/2009 | |
| CN | 101711354 A | 5/2010 | |
| CN | 101878409 A | 11/2010 | |
| CN | 102027434 A | 4/2011 | |
| CN | 102036599 A | 4/2011 | |
| CN | 102231037 A | 11/2011 | |
| CN | 102362150 A | 2/2012 | |
| CN | 102385237 A | 3/2012 | |
| CN | 102572485 A * | 7/2012 | ............. H04N 13/00 |
| CN | 102638692 A | 8/2012 | |
| CN | 102760234 A | 10/2012 | |
| CN | 102803894 A | 11/2012 | |
| CN | 102831380 A | 12/2012 | |
| CN | 102867328 A | 1/2013 | |
| CN | 103308517 A | 9/2013 | |
| EP | 0085210 A1 | 8/1983 | |
| EP | 2295932 A1 | 3/2011 | |
| EP | 2400261 A1 | 12/2011 | |
| GB | 2481459 A | 12/2011 | |
| JP | 2000341721 A | 12/2000 | |
| JP | 2003058911 A | 2/2003 | |
| JP | 2004135209 A | 4/2004 | |
| JP | 2005341470 A | 12/2005 | |
| JP | 2006229802 A | 8/2006 | |
| JP | 2009014501 A | 1/2009 | |
| JP | 2010011223 A | 1/2010 | |
| JP | 201054522 A | 2/2010 | |
| JP | 2010145186 A | 7/2010 | |
| JP | 2011514232 A | 5/2011 | |
| JP | 2013541119 A | 12/2013 | |
| KR | 20110046222 A | 5/2011 | |
| KR | 1020110132260 A | 12/2011 | |
| KR | 101137646 B1 | 4/2012 | |
| RU | 2237284 C2 | 9/2004 | |
| WO | 2006016303 A2 | 2/2006 | |
| WO | 2007132399 A1 | 11/2007 | |
| WO | 2009046268 A1 | 4/2009 | |
| WO | 2012137434 A1 | 10/2012 | |

OTHER PUBLICATIONS

Yoon et al., "Locally adaptive support-weight approach for visual correspondence search", Robotics and Computer Vision Laboratory, KAIST.*
Gu et al., "Trinocular disparity estimation with adaptive support weight and disparity calibration" Sichuwan Univeristy, Optical Engineering, Mar. 2008.*
Gao, et al.,"Stereo matching algorithm based on illumination normal similarity and adaptive support weight", In Proceedings of Optical Engineering, vol. 52, Issue 2, Feb. 2013, 8 pages.
Hosni, et al.,"Near Real-Time Stereo With Adaptive Support Weight Approaches", In Proceedings of International Symposium 3D Data Processing, Visualization and Transmission, May 17, 2010, 8 pages.
"First Office Action & Search Report Issued in Chinese Patent Application No. 201480021422.5", dated Mar. 21, 2017, 16 Pages.
"International Search Report Issued in PCT Application No. PCT/US2014/033996", dated Jul. 31, 2014, 3 Pages.
"Second Office Action Issued in Chinese Patent Application No. 201480021422.5", dated Dec. 11, 2017, 14 Pages.
"Connected Component (Graph Theory)", Retrieved From: https://en.wikipedia.org/w/index.php?title=Connected_component_(graph_theory)&oldid=841872370, Retrieved on: Sep. 8, 2018, 3 Pages.
"Final Office Action Issued in U.S. Appl. No. 13/915,622", dated Jan. 21, 2016, 28 Pages.

(56) References Cited

OTHER PUBLICATIONS

"Final Office Action Issued in U.S. Appl. No. 13/915,622", dated Mar. 7, 2017, 28 Pages.
"Final Office Action Issued in U.S. Appl. No. 13/915,622", dated Mar. 9, 2018, 28 Pages.
"Non Final Office Action Issued in U.S. Appl. No. 13/915,622", dated Aug. 5, 2016, 39 Pages.
"Non Final Office Action Issued in U.S. Appl. No. 13/915,622", dated Sep. 2, 2015, 28 Pages.
"Non Final Office Action Issued in U.S. Appl. No. 13/915,622", dated Aug. 15, 2017, 27 Pages.
"Second Written Opinion Issued in PCT Application No. PCT/US2014/033919", dated Mar. 27, 2015, 6 Pages.
"Final Office Action Issued in U.S. Appl. No. 13/915,626", dated Jul. 11, 2016, 13 Pages.
"Final Office Action Issued in U.S. Appl. No. 13/915,626", dated Mar. 28, 2017, 17 Pages.
"Non Final Office Action Issued in U.S. Appl. No. 13/915,626", dated Dec. 9, 2016, 16 Pages.
"Non Final Office Action Issued in U.S. Appl. No. 13/915,626", dated Jan. 29, 2016, 17 Pages.
"Final Office Action Issued in U.S. Appl. No. 13/918,892", dated Nov. 19, 2015, 7 Pages.
"Final Office Action Issued in U.S. Appl. No. 13/918,892", dated Dec. 21, 2016, 6 Pages.
"Non Final Office Action Issued in U.S. Appl. No. 13/918,892", dated Mar. 28, 2016, 6 Pages.
"Non Final Office Action Issued in U.S. Appl. No. 13/918,892", dated May 11, 2015, 6 Pages.
"Final Office Action Issued in U.S. Appl. No. 13/923,135", dated Jul. 27, 2015, 21 Pages.
"Final Office Action Issued in U.S. Appl. No. 13/923,135", dated Oct. 3, 2016, 15 Pages.
"Non Final Office Action Issued in U.S. Appl. No. 13/923,135", dated May 5, 2017, 17 Pages.
"Non Final Office Action Issued in U.S. Appl. No. 13/923,135", dated Mar. 31, 2016, 14 Pages.
"Non Final Office Action Issued in U.S. Appl. No. 13/923,135", dated Dec. 19, 2014, 13 Pages.
"Final Office Action Issued in U.S. Appl. No. 13/924,475", dated May 6, 2016, 13 Pages.
"Non Final Office Action Issued in U.S. Appl. No. 13/924,475", dated Sep. 8, 2016, 15 Pages.
"Non Final Office Action Issued in U.S. Appl. No. 13/924,475", dated Mar. 24, 2015, 17 Pages.
"Non Final Office Action Issued in U.S. Appl. No. 13/924,475", dated Oct. 7, 2015, 14 Pages.
"Final Office Action Issued in U.S. Appl. No. 13/924,485", dated Sep. 13, 2016, 16 Pages.
"Final Office Action Issued in U.S. Appl. No. 13/924,485", dated Jul. 20, 2017, 16 Pages.
"Non Final office Action issued in U.S. Appl. No. 13/924,485", dated Dec. 15, 2015, 15 Pages.
"Non-Final Office Action Issued in U.S. Appl. No. 13/924,485", dated Mar. 7, 2017, 16 Pages.
"Final Office Action Issued in U.S. Appl. No. 13/925,762", dated May 11, 2016, 22 Pages.
"Final Office Action Issued in U.S. Appl. No. 13/925,762", dated May 9, 2017, 26 Pages.
"Non Final Office Action Issued in U.S. Appl. No. 13/925,762", dated Oct. 3, 2016, 28 Pages.
"Non Final Office Action Issued in U.S. Appl. No. 13/925,762", dated Nov. 5, 2015, 13 Pages.
"Non Final Office Action Issued in U.S. Appl. No. 14/088,408", dated Sep. 29, 2016, 16 Pages.
"Final Office Action Issued in U.S. Appl. No. 14/253,696", dated Feb. 25, 2016, 23 Pages.
"Non Final Office Action Issued in U.S. Appl. No. 14/253,696", dated Sep. 10, 2015, 18 Pages.

Yamaguchi, et al., "Interleaved Pixel Lookup for Embedded Computer Vision", In Proceedings of IEEE Computer Society Conference on Computer Vision and Pattern Recognition Workshops, Jun. 23, 2008, 8 Pages.
"Office Action Issued in European Patent Application No. 14723271.4", dated Sep. 19, 2016, 9 Pages.
"Office Action Issued in European Patent Application No. 14723271.4", dated Jun. 29, 2017, 12 Pages.
"Summon to Attend Oral Hearing Issued in European Patent Application No. 14723271.4", Mailed Date: Mar. 29, 2018, 10 Pages.
"Office Action Issued in Australian Patent Application No. 2014254219", dated Apr. 19, 2017, 3 Pages.
"First Office Action and Search Report Issued in Chinese Patent Application No. 201480021199.4", dated May 31, 2017, 17 Pages.
Yang, et al., "Spatial-Depth Super Resolution for Range Images", In Proceedings of the IEEE Conference on Computer Vision and Pattern Recognition, Jun. 17, 2007, 8 Pages.
"Second Office Action Issued in Chinese Patent Application No. 201480021199.4", dated Jan. 17, 2018, 7 Pages.
"Third Office Action Issued in Chinese Patent Application No. 201480021199.4", dated Jun. 19, 2018, 13 Pages.
"Decision on Rejection Issued in Chinese Patent Application No. 201480021422.5", dated Jul. 5, 2018, 10 Pages.
"First Office Action and Search Report Issued in Chinese Patent Application No. 201480021460.0", dated Mar. 28, 2017, 17 Pages.
"Second Office Action Issued in Chinese Patent Application No. 201480021460.0", dated Dec. 11, 2017, 6 Pages.
"Third Office Action Issued in Chinese Patent Application No. 201480021460.0", dated Jul. 2, 2018, 7 Pages.
"Decision on Rejection Issued in Chinese Patent Application No. 201480021487.X", dated Jun. 20, 2018, 7 Pages.
"First Office Action Issued in Chinese Application No. 201480021487.X", dated Apr. 21, 2017, 12 Pages.
"Second Office Action Issued in Chinese Patent Application No. 201480021487.X", dated Dec. 15, 2017, 10 Pages.
"Office Action Issued in Chinese Patent Application No. 201480021493.5", dated Dec. 19, 2017, 12 Pages.
"Second Office Action Issued in Chinese Patent Application No. 201480021493.5", dated Aug. 15, 2018, 10 Pages.
"Decision on Rejection Issued in Chinese Patent Application No. 201480021519.6", dated Sep. 4, 2018, 10 Pages.
"First Office Action and Search Report Issued in Chinese Patent Application No. 201480021519.6", dated Aug. 30, 2016, 18 Pages.
"Fourth Office Action Issued in Chinese Patent Application No. 201480021519.6", dated Mar. 8, 2018, 15 Pages.
"Office Action Issued in Chinese Patent Application No. 201480021519.6", dated Sep. 19, 2017, 14 Pages.
"Second Office Action and Search Report Issued in Chinese Patent Application No. 201480021519.6", dated Mar. 30, 2017, 17 Pages.
"First Office Action and Search Report Issued in Chinese Patent Application No. 201480021528.5", dated Dec. 11, 2017, 14 Pages.
"Second Office Action Issued in Chinese Patent Application No. 201480021528.5", dated Aug. 2, 2018, 8 Pages.
"First Office Action and Search Report Issued in Chinese Patent Application No. 201480021958.7", dated Oct. 18, 2017, 19 Pages.
"Second Office Action Issued in Chinese Patent Application No. 201480021958.7", dated Jun. 13, 2018, 16 Pages.
"Third Office Action Issued in Chinese Patent Application No. 201480021958.7", dated Dec. 3, 2018, 10 Pages.
"Office Action Issued in Russian Patent Application No. 2015143654", dated Jan. 31, 2018, 8 Pages.
"Office Action Issued in Japanese Patent Application No. 2016-508993", dated Feb. 6, 2018, 5 Pages.
"Office Action Issued in Japanese Patent Application No. 2016-508993", dated Aug. 7, 2018, 5 Pages.
Anderson, et al., "The IBM System/360 Model 91: Machine Philosophy and Instruction-Handling", In IBM Journal of Research and Development, vol. 11, Issue 1, Jan. 1, 1967, pp. 8-24.
Chihoub, et al., "A Band Processing Imaging Library for a Tricore-Based Digital Still Camera", In Research Article of Real-Time Imaging, vol. 7, Issue 4, Aug. 1, 2001, pp. 327-337.

(56) References Cited

OTHER PUBLICATIONS

Hariyama, et al., "Optimal Periodical Memory Allocation for Logic-In-Memory Image Processors", In Proceedings of the Emerging VLSI Technologies and Architectures, vol. 6, Mar. 2, 2006, 6 Pages.
Kanade, et al., "Development of a Video-Rate Stereo Machine", In Proceedings of IEEE/RSJ International Conference on Intelligent Robots and Systems, Aug. 5, 1995, pp. 95-100.
Kuon, et al., "FPGA Architecture: Survey and Challenges", In Foundations and Trends in Electronic Design Automation vol. 2, Issue 2, Apr. 18, 2008, pp. 135-253.
Langmann, et al., "Depth Camera Technology Comparison and Performance Evaluation", In Proceedings of the 1st International Conference on Pattern Recognition Applications and Methods, Issue 2, Feb. 2012, pp. 438-444.
McLlroy, et al., "Kinectrack: Agile 6-DoF Tracking Using a Projected Dot Pattern", In IEEE International Symposium on Mixed and Augmented Reality, Nov. 5, 2012, 7 Pages.
"Office Action Issued in Mexican Patent Application No. MX/a/2015/014577", dated Nov. 10, 2017, 3 Pages.
"International Preliminary Report on Patentability Issued in PCT Application No. PCT/US2014/033909", dated Jun. 29, 2015, 17 Pages.
"International Search Report and Written Opinion Issued in PCT Application No. PCT/US2014/033909", dated Jul. 25, 2014, 16 Pages.
"Second Written Opinion Issued in PCT Application No. PCT/US2014/033909", dated Mar. 25, 2015, 14 Pages.
"International Preliminary Report on Patentability Issued in PCT Application No. PCT/US2014/033910", dated Jul. 24, 2015, 8 Pages.
"International Search Report and Written Opinion Issued in PCT Application No. PCT/US2014/033910", dated Jul. 25, 2014, 9 Pages.
"Second Written Opinion Issued in PCT Application No. PCT/US2014/033910", dated Dec. 18, 2014, 5 Pages.
"International Preliminary Report on Patentability Issued in PCT Application No. PCT/US2014/033911", dated Jul. 13, 2015, 6 Pages.
"International Search Report and Written Opinion Issued in PCT Application No. PCT/US2014/033911", dated Aug. 29, 2014, 8 Pages.
"Second Written Opinion Issued in PCT Application No. PCT/US2014/033911", dated Apr. 2, 2015, 5 Pages.
"International Preliminary Report on Patentability Issued in PCT Application No. PCT/US2014/033915", dated Apr. 7, 2015, 10 Pages.
"International Search Report and Written Opinion Issued in PCT Application No. PCT/US2014/033915", dated Jul. 16, 2014, 11 Pages.
"Second Written Opinion Issued in PCT Application No. PCT/US2014/033915", dated Jan. 8, 2015, 9 Pages.
"International Preliminary Report on Patentability Issued in PCT Application No. PCT/US2014/033916", dated Jul. 13, 2015, 7 Pages.
"International Search Report and Written Opinion Issued in PCT Application No. PCT/US2014/033916", dated Jul. 18, 2014, 8 Pages.
"Second Written Opinion Issued in PCT Application No. PCT/US2014/033916", dated Mar. 27, 2015, 6 Pages.
"International Preliminary Report on Patentability Issued in PCT Application No. PCT/US2014/033917", dated Jul. 20, 2015, 8 Pages.

"International Search Report and Written Opinion Issued in PCT Application No. PCT/US2014/033917", dated Jul. 18, 2014, 10 Pages.
"International Preliminary Report on Patentability Issued in PCT Application No. PCT/US2014/033919", dated Jul. 13, 2015, 7 Pages.
"International Search Report and Written Opinion Issued in PCT Application No. PCT/US2014/033919", dated Jul. 17, 2014, 8 Pages.
"Non Final Office Action Issued in U.S. Appl. No. 15/912,555", dated Apr. 18, 2019, 16 Pages.
"Notice on Reexamination Issued in Chinese Patent Application No. 201480021519.6", dated Mar. 29, 2019, 8 Pages.
"Third Office Action Issued in Chinese Patent Application No. 201480021528.5", dated Feb. 11, 2019, 9 Pages.
"Third Office Action Issued in Chinese Patent Application No. 201480021493.5", dated Feb. 26, 2019, 10 Pages.
"Fourth Office Action Issued in Chinese Patent Application No. 201480021460.0", dated Jan. 24, 2019, 6 Pages.
Notice of Allowance Issued in U.S. Appl. No. 14/253,696, dated Jul. 21, 2016, 17 Pages.
"Office Action Issued in European Patent Application No. 14724942.9", dated Oct. 21, 2019, 8 Pages.
"Office Action Issued in European Patent Application No. 14725312.4", dated Oct. 9, 2019, 5 Pages.
"Office Action Issued in European Patent Application No. 14727992.1", dated Oct. 9, 2019, 8 Pages.
"Final Office Action Issued in U.S. Appl. No. 15/912,555", dated Oct. 8, 2019, 15 Pages.
"Decision on Rejection Issued in Chinese Patent Application No. 201480021493.5", dated Aug. 21, 2019, 6 Pages.
"Office Action Issued in Indian Patent Application No. 6032/CHENP/2015", dated Aug. 13, 2019, 6 Pages.
Schuon, et al., "High-Quality Scanning Using Time-of-Flight Depth Superresolution", In Proceedings of IEEE Computer Society Conference on Computer Vision and Pattern Recognition Workshops, Jun. 23, 2008, 7 Pages.
"Office Action Issued in European Patent Application No. 14724934.6", dated Oct. 24, 2019, 8 Pages.
"Office Action Issued in European Patent Application No. 14725861.0", dated Nov. 8, 2019, 5 Pages.
"Office Action Issued in Chinese Patent Application No. 201480021422.5", dated Nov. 12, 2019, 6 Pages.
"Non Final Office Action Issued in U.S. Appl. No. 15/889,188", dated Jul. 9, 2019, 13 Pages.
"Office Action Issued in European Patent Application No. 14726261.2", dated Nov. 29, 2019, 8 Pages.
"Final Office Action Issued in U.S. Appl. No. 15/889,188", dated Jan. 17, 2020, 6 Pages.
"Non Final Office Action Issued in U.S. Appl. No. 15/937,851", dated Dec. 23, 2019, 14 Pages.
"Non Final Office Action Issued in U.S. Appl. No. 15/912,555", dated Feb. 7, 2020, 17 Pages.
"Third Office Action Issued in Chinese Patent Application No. 201480021487.X", dated Feb. 28, 2020, 18 Pages.
"Office Action Issued in Indian Patent Application No. 6362/CHENP/2015", dated Feb. 26, 2020, 6 Pages.
"Notice of Allowance Issued in Korean Patent Application No. 10-2015-7032651", dated Apr. 13, 2020, 4 Pages.
"Office Action Issued in Korean Patent Application No. 10-2015-7032633", dated Apr. 8, 2020, 8 Pages.
"Final Office Action Issued in U.S. Appl. No. 15/912,555", dated Jun. 10, 2020, 16 Pages.

\* cited by examiner

ACTIVE STEREO WITH ADAPTIVE SUPPORT WEIGHTS FROM A SEPARATE IMAGE

CROSS-REFERENCE TO RELATED APPLICATION

The present application claims priority to U.S. provisional patent application Ser. No. 61/812,232, filed Apr. 15, 2013.

BACKGROUND

One method of performing depth estimation with a stereo pair of images is to find correspondences between them by comparing small image patches from one image to patches from the other image. In order to measure how well a pixel p in one image matches a pixel q in the other image, a patch centered on p is compared to a patch centered on q, using a matching score such as normalized cross-correlation (NCC) or the sum of squared differences (SSD).

For example, the (negative) SSD between a patch at pixel p in the left image $I_L$ and a patch at pixel q in the right image $I_R$ is computed as $$-\sum_{i=-r}^{r}\sum_{j=-r}^{r}(I_L(p_x+i,p_y+j)-I_R(q_x+i,q_y+j))^2,$$

where r is the radius of the patch; (the negation is used so that similar patches receive a high score, while dissimilar patches receive a low score).

In order to ensure that this matching score is high for the correct match, and low for all other possible matches, an active illumination pattern may be applied to the scene (e.g. a pattern of pseudorandom laser dots). This ensures that the patches contain some distinctive texture. In order to make the active illumination invisible to humans, the active illumination and stereo cameras may operate in the infrared (IR) region of the spectrum, instead of the visible part.

One problem with patch-based stereo is that pixels near depth discontinuities (e.g. at object boundaries) may receive incorrect depth estimates, due to the fact that a patch may include pixels from two different depths (sometimes referred to as "stereo fattening"). For a pixel p whose true depth is z1, but which lies near an object whose depth is z2, the patch may include pixels from both z1 and z2. If the z2 pixels in the patch have stronger texture than the z1 pixels, the matching score may be higher for z2 than for z1, even though the true depth is z1. This leads to pixel p receiving an incorrect depth estimate of z2.

In order to mitigate this effect in other patch matching scenarios, one popular method is to assign each pixel in the patch a weight, based on whether that pixel is believed to lie at the same depth as the pixel of interest p. Parts of the patch which have the same depth as p should receive a high weight, while parts which have different depths should receive a low weight. When computing the NCC or SSD, the contributions of the different parts of the patch are weighted. This method is generally referred to as "Adaptive Support Weights" (ASWs).

Because the depths of the pixels in the patch are unknown, the weights are computed by looking only at the input images. The assumption underlying in ASW approaches is that, in images captured with IR or RGB (visible spectrum) cameras without active patterned illumination, pixels that have similar depths within a patch generally have similar colors. Thus, one simple way to compute the weights for each pixel in the patch is to compare its color to that of the central pixel p. Pixels with similar color to the central pixel receive high weights, and pixels with different colors receive low weights. Using these weights in the SSD match score above, the computation is:

$$-\sum_{i=-r}^{r}\sum_{j=-r}^{r}w_{ij}(I_L(p_x+i,p_y+j)-I_R(q_x+i,q_y+j))^2.$$

The weights $w_{ij}$ can be computed from the left image by comparing the patch pixels to the central pixel:

$$w_{ij}=\exp\left(-\frac{|I_L(p_x+i,p_y+j)-I_L(p_x,p_y)|}{\lambda}\right),$$

where λ is a scalar parameter.

The problem with computing adaptive support weights on IR images with active illumination is that the patterned illumination breaks the assumption that the color of a surface will be approximately constant. The illumination pattern causes large intensity/color changes to occur everywhere, not only at object boundaries, whereby the stereo matching degrades.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards using weights from a non-actively illuminated image to determine patch similarity for pixel matching in the actively illuminated stereo images. One or more aspects are directed towards processing a plurality of images, including actively illuminated stereo images, and a non-actively illuminated image. Processing includes determining weights for a patch in the non-actively illuminated image that corresponds to patches in the actively illuminated stereo images, in which each of the patches is based upon a reference pixel in one of the images. The support weights to determine a similarity score between the corresponding patches in the actively illuminated stereo images.

In one or more aspects, an image processing component includes a matching algorithm coupled to an image capturing component that captures a plurality of images including actively illuminated stereo images, and a non-actively illuminated image. The image processing component is configured to process the plurality of images, including via the matching algorithm. The matching algorithm processes a patch in the non-actively illuminated image to determine weights corresponding to pixels in the patch, and uses the weights to determine similarity between corresponding patches in the actively illuminated images.

One or more aspects are directed towards receiving actively illuminated stereo infrared (IR) images and receiving a non-actively illuminated image. Adaptive support weights are obtained for a patch in the non-actively illuminated image. The adaptive support weights are used in an active support weights computation to determine similarity of corresponding patches in the actively illuminated stereo IR images.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using a non-actively illuminated image to provide adaptive support weights for two actively illuminated stereo images that are being processed to find matching pixels therein. For example, a third camera may be used to capture a third (non-actively illuminated) image via light from a part of the spectrum (e.g., visible light) that is different from the active illumination spectrum (e.g., infrared) that is sensed in the captured stereo images. In general, in the non-actively illuminated image, the active illumination pattern is not visible, whereby the general assumption that pixels with similar depths have similar colors holds true. Thus, for any pixel being evaluated in the actively illuminated stereo images, adaptive support weights can be determined based upon similarities (e.g., color similarities) between the counterpart pixel and its patch's pixels in the non-actively illuminated image. As a result, adaptive support weights are able to be used in active stereo image matching.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in active depth sensing and image processing in general.

Figure 1:
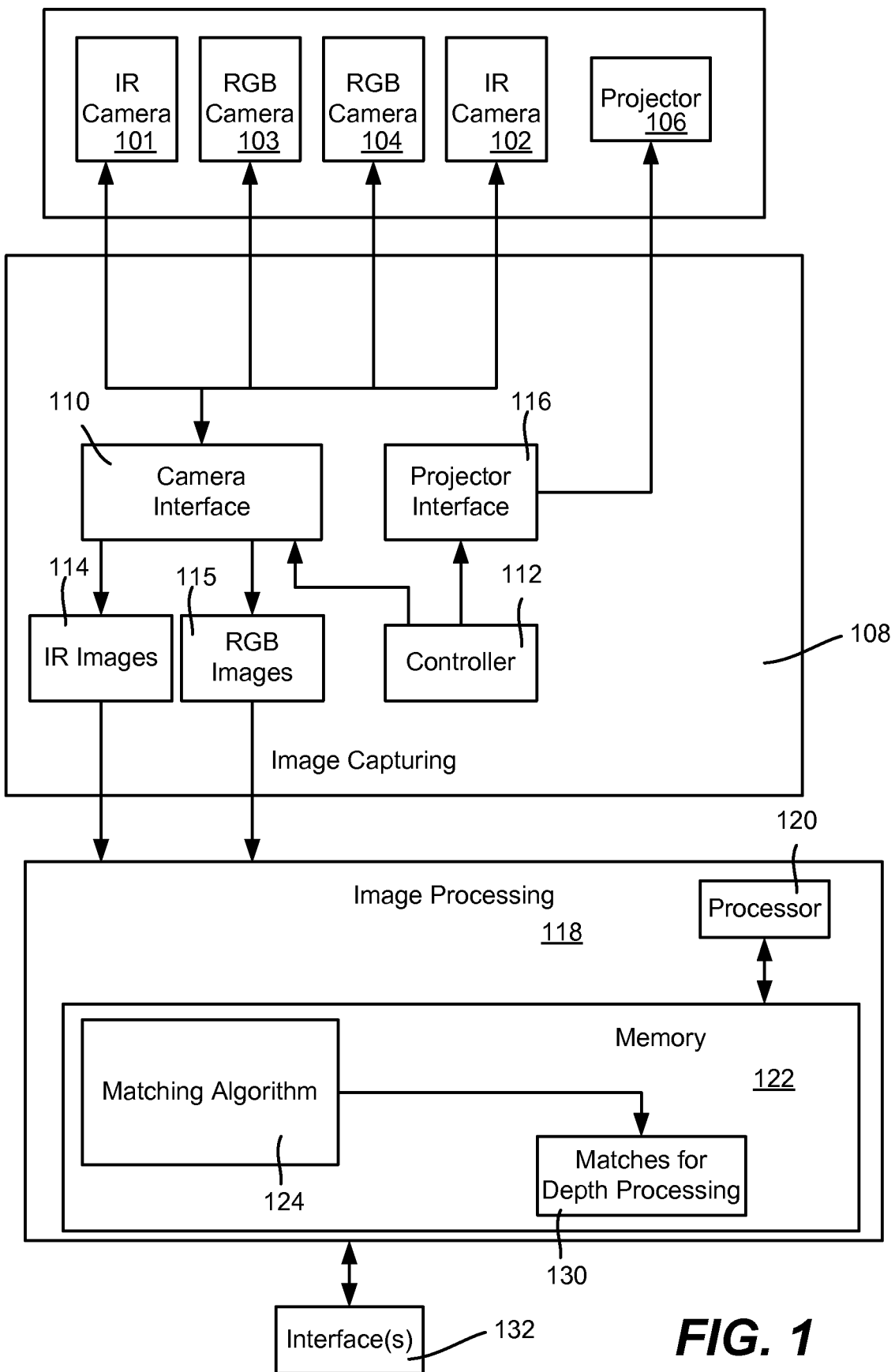
FIG. 1 is a block diagram representing example components that may be used to project and capture actively illuminated images and a non-actively illuminated image, according to one or more example implementations.

FIG. 1 shows an example system in which stereo IR cameras 101 and 102, stereo RGB cameras 103 and 104, and a projector 106 (e.g., an IR laser diffracted into many thousands of dots) captures stereo IR images and RGB images. Note that this is only one example arrangement, and that in other arrangements, the cameras 101-104 may be arranged in any order relative to one another. For example, one of the RGB cameras and one of the IR cameras may share an optical path; the other RGB and other IR camera may similarly do so. In other arrangements, only one RGB camera is present. As yet another example, the projector may be positioned above the cameras. Further, any of the cameras and/or the projector may be physically separated from one another, rather than being part of any fixed configuration. Thus, FIG. 1 is only showing example components for purposes of explanation, and no scale, relative dimensions, relative positions, combinations of devices within a housing/pod device and so on should be inferred from FIG. 1.

In the example of FIG. 1, the cameras 101-104 and projector 106 are coupled to (or combined with) an image capturing system or subsystem 108. The cameras are generally controlled, e.g., via camera interface 110 and controller 111, to capture stereo images synchronized in time (e.g., the cameras are "genlocked"). In one implementation the cameras 101 and 102 capture infrared (IR) images 114, as IR is highly effective in depth estimation in varying light conditions and does not affect the visible appearance of the scene. Further, the cameras 103 and 104 capture stereo RGB images 115, genlocked with the IR images.

In FIG. 1, a projector 106 is shown that projects an IR pattern onto a scene, such as a pattern of spots (e.g., dots) or a line pattern, although other spot shapes and/or pattern types may be used. For purposes of brevity, dots are generally described hereinafter. By illuminating the scene with a relatively large number of distributed infrared dots, the IR cameras 102 and 103 capture texture data as part of the infrared image data. Note that the projector 106 is shown as coupled to he controller 112 via a projector interface 116; any such control may be as simple as turning the projector on and off or using energy saving modes, however more complex control such as pulsing, changing dot distribution, changing intensity and/or the like is feasible.

The images captured by the cameras 101-104 are provided to an image processing system or subsystem 118. In some implementations, the image processing system 118 and image capturing system or subsystem 104, or parts thereof, may be combined into a single device. For example a home entertainment device may include all of the components shown in FIG. 1 (as well as others not shown). In other implementations, parts (or all) of the image capturing system or subsystem 104, such as the cameras and projector may be a separate device that couples to a gaming console, personal computer, mobile device, dedicated processing device and/or the like.

The image processing system or subsystem 118 includes a processor 120 and a memory 122 containing one or more image processing algorithms, including a stereo matching algorithm 124 as described herein. This may be in hardware logic, firmware and/or in software. In general, in one implementation the stereo matching algorithm 124 determines which dots in a left IR image correlate with which dots in a right IR image, (block 130) whereby depth data may be determined by further processing disparities between matching dots; a depth map thus may be computed.

Also shown in FIG. 1 is an interface 132 to the image processing system or subsystem 118, such as for connecting a keyboard, game controller, display, pointing device microphone for speech commands and/or the like as appropriate for a user to interact with an application or the like.

Note that a calibrated projector may be treated as a camera. That is, if the projected pattern is known, and the projector is calibrated (e.g., its position/orientation/focal length and so forth are known), then patch-based stereo (as described herein) between the known projector image (which as used herein may be considered a captured image) and the actively-illuminated camera image, using adaptive support weights computed from the non-actively-illuminated image, may be performed. Thus, an alternative system may comprise one calibrated projector, one camera to capture an actively-illuminated image, and one camera to capture a non-actively-illuminated image.

Figure 2:
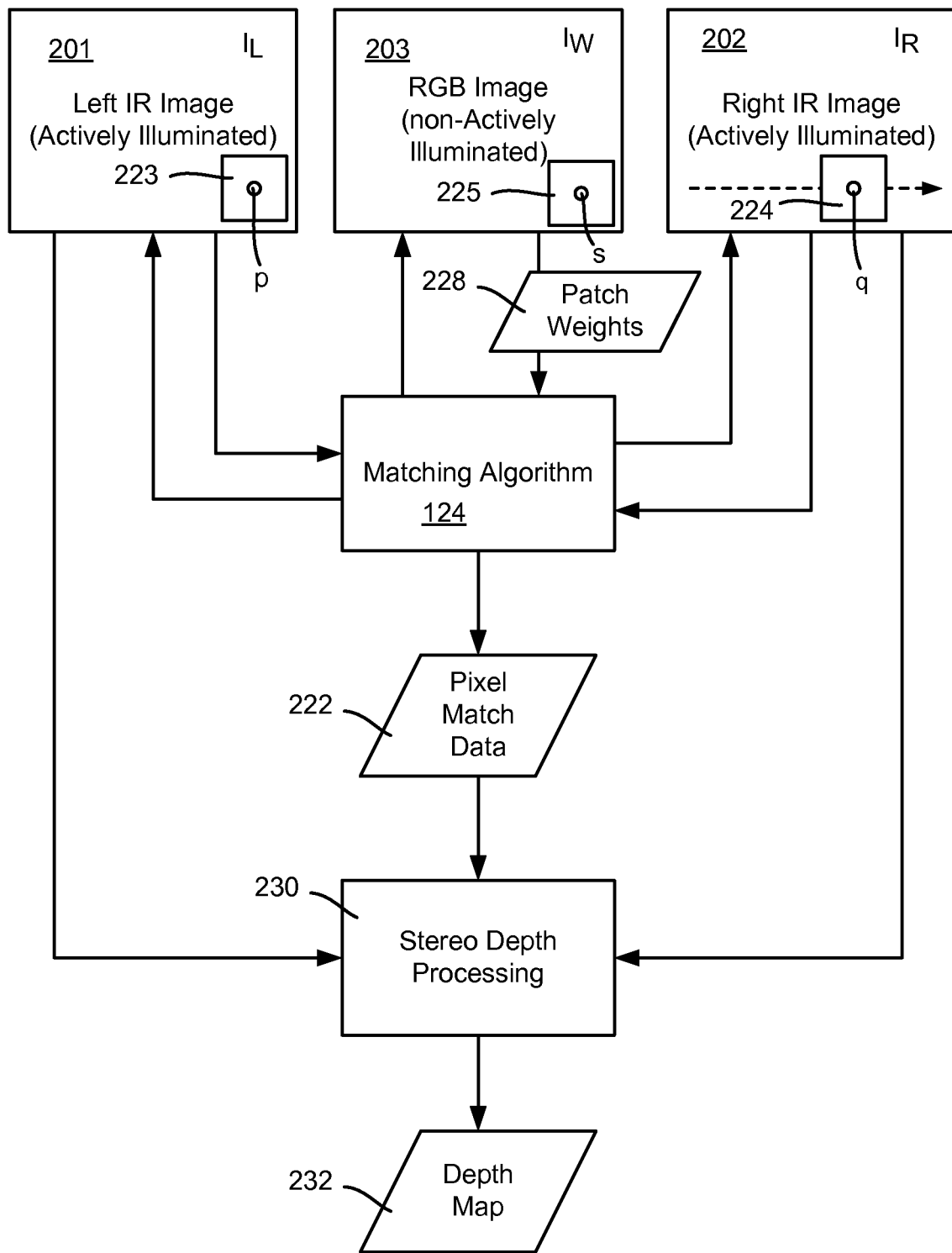
FIG. 2 is a representation of processing images to determine similarity of patches in actively illuminated images based upon weights obtained from a non-actively illuminated image, according to one or more example implementations.

FIG. 2 exemplifies aspects of the matching algorithm 124. In one implementation, the matching algorithm processes the left IR image 101, the right IR image 102 and the RGB image 103 to determine pixel match data 222 between the left and right IR images 101 and 102. As described herein, the matching algorithm 124 extracts patch weights from an RGB image 203, e.g., the left image if there are stereo RGB images available.

More particularly, when computing a match score between a pixel p in the left image 201 (also referred to as $I_L$) and a pixel q in the right image 202 (also referred to as $I_R$), and the relative positions and orientations of the three cameras are known, the position of the pixel (denoted s) in the third image 203 (also referred to as $I_W$) where the corresponding point would be visible, if p and q did indeed match. The matching algorithm 124 computes the weighted match score between the patches 223 and 224 around p and q, with weights 228 taken from the patch 225 around s in the third image, denoted $I_W$:

$$w_{ij} = \exp\left(-\frac{|I_W(s_x + i, s_y + j) - I_W(s_x, s_y)|}{\lambda}\right).$$

where $\lambda$ is a scalar parameter.

The contributions of the different parts of the patch 225 are thus weighted based upon other pixels' similarities (e.g., color) in the patch 225 to the pixel s. These weights 228 may be used as if extracted from the actively illuminated images, that is, they are used when computing the NCC or SSD, e.g., based upon conventional Adaptive Support Weights technology, except with externally determined weights. Note that NCC may benefit from having weights decoupled from the patches being processed with those weights.

With the pixel match data 222, further stereo depth processing 230 may determine a depth map 232. For example, disparities in one or more features between matched pixels (e.g., along with triangulation) may be used to determine depth.

In one implementation, the left image's pixel p is chosen as the reference pixel, with the right image 202 scanned along a line to find candidate q pixels to find a best match, with the s pixel in the image 103 re-determined as the scanning progresses. Notwithstanding, this may be reversed in other implementations, e.g., the left image may be scanned with the right image used as the reference point.

In another alternative, the pixels (e.g., the pixel s) in the non-actively illuminated image 203 may be chosen as the reference points. In this situation, both left and right images 201 and 202, respectively, may be simultaneously processed to look for matching pixels based upon Adaptive Support Weights techniques.

Figure 3:
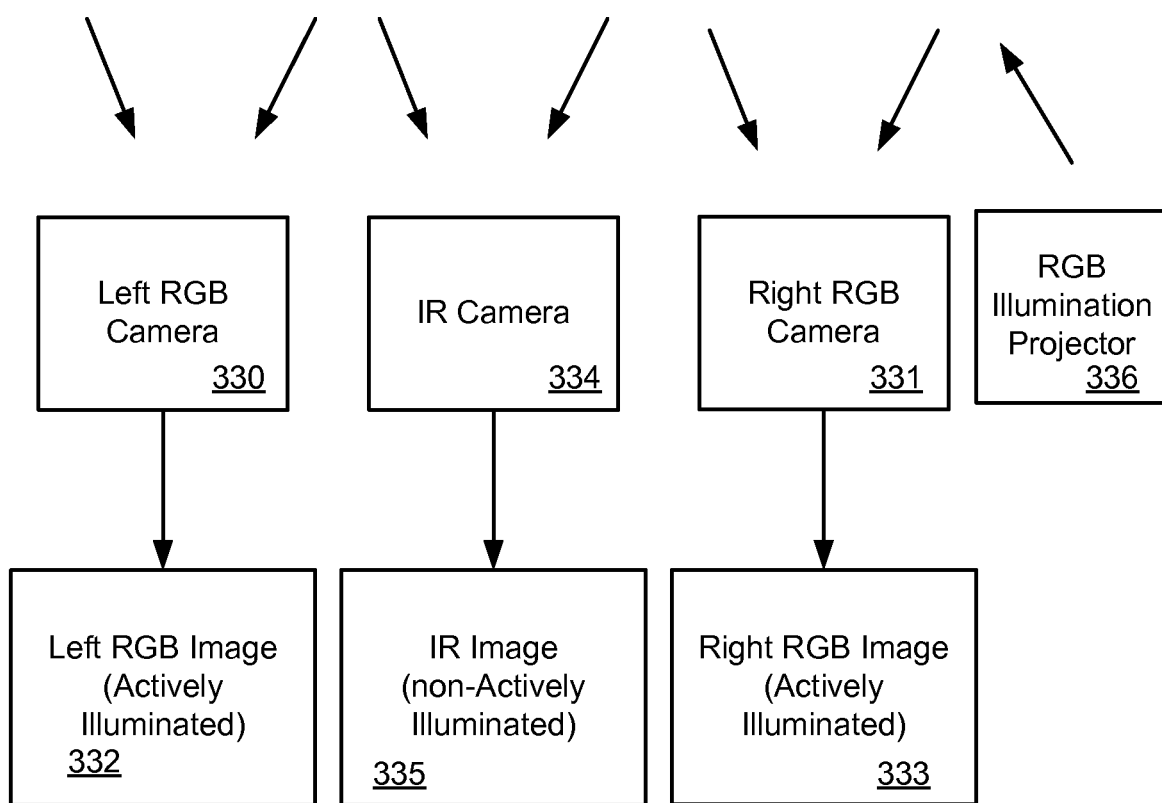
FIG. 3 is a representation of visible light (RGB) cameras arranged to capture actively illuminated stereo RGB images and an infrared (IR) camera arranged to capture a non-actively illuminated image, according to one or more example implementations.

As can be readily appreciated, various possible other camera combinations may benefit from the technology described herein. For example, instead of the configuration in FIG. 2 where stereo IR cameras capture the stereo images with an RGB camera to provide an image for adaptive support weights, in FIG. 3 stereo RGB cameras 330, 331 may capture images 332, 333 illuminated with visible light, with an IR camera 334 for used to provide an image 335 for adaptive support weights. An RGB projector 336 is also represented in FIG. 3.

Figure 4:
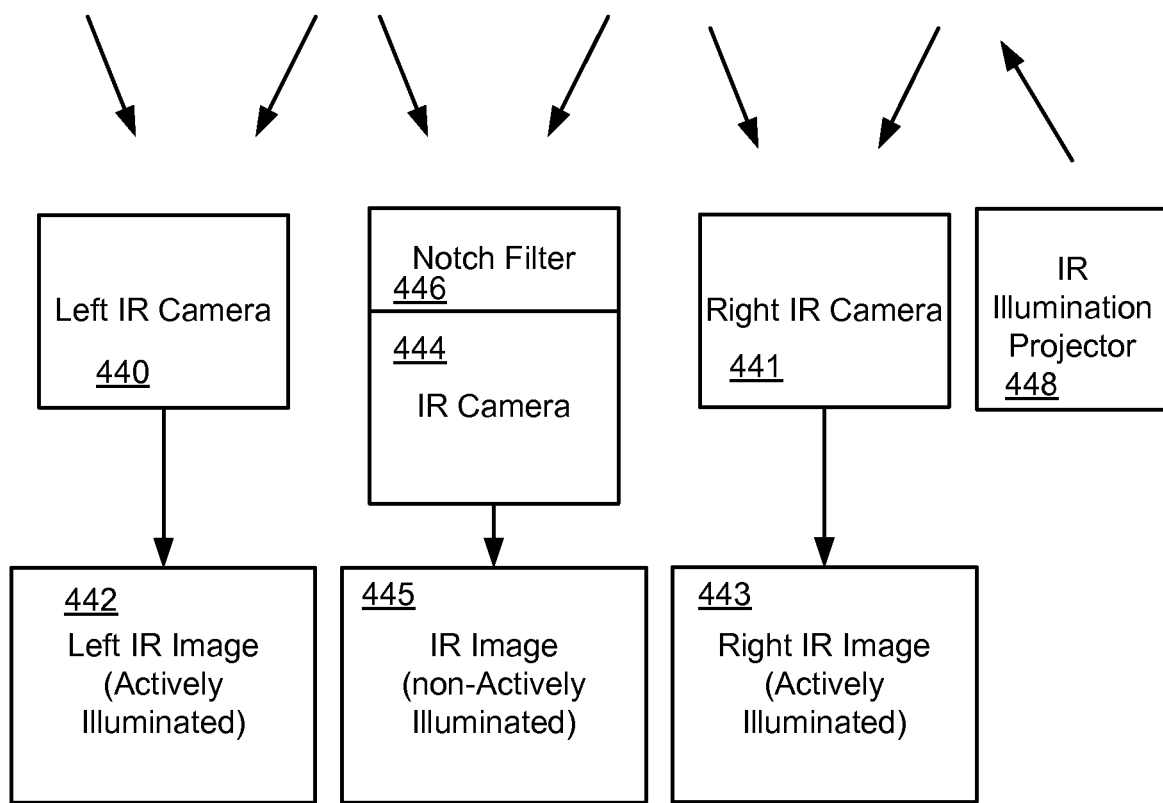
FIG. 4 is a representation of infrared (IR) cameras arranged to capture stereo IR images actively illuminated in one part of the IR spectrum, and an IR camera arranged with a notch filter to capture a non-actively illuminated image, according to one or more example implementations.

Another alternative is to use filtering, as generally represented in FIG. 4. For example, stereo IR cameras 440 and 441 may capture the actively illuminated images 442 and 443, respectively. Another IR camera 444, in which the other IR camera has a notch filter 446 to remove the part of the spectrum that contains the active illumination and thereby provide a non-actively illuminated image 445 for adaptive support weights. An IR projector 448 is also represented in FIG. 3.

Time slicing also may be used. For example, the same camera may capture one actively illuminated frame followed by one non-actively illuminated frame. If the frame rate is fast enough relative to any motion in the scene being captured, the pixel matching may be based on using weights extracted from the non-actively illuminated frame.

Turning to another aspect, the equations exemplified herein are presented in a simplified form with respect to a three camera setup, using square patches having identical patch sizes in the three images. In reality, a square patch from one image will appear distorted in both the other two images, and may also have a different size. However, the distortions and size differences may be compensated for in known ways, and in general the underlying concepts are identical.

Notwithstanding, to reduce such effects, in another aspect, two cameras may share the same optical path, one for capturing the actively illuminated image and another for capturing the non-actively illuminated image. Having the same optical path simplifies the computations, e.g., the p and s pixels (or the q and s pixels) shown in FIG. 2 have the same location in their respective images, and the patches for those two pixels will be the same size and shape as well. Sharing an optical path may be accomplished by reflection, for example.

Figure 5:
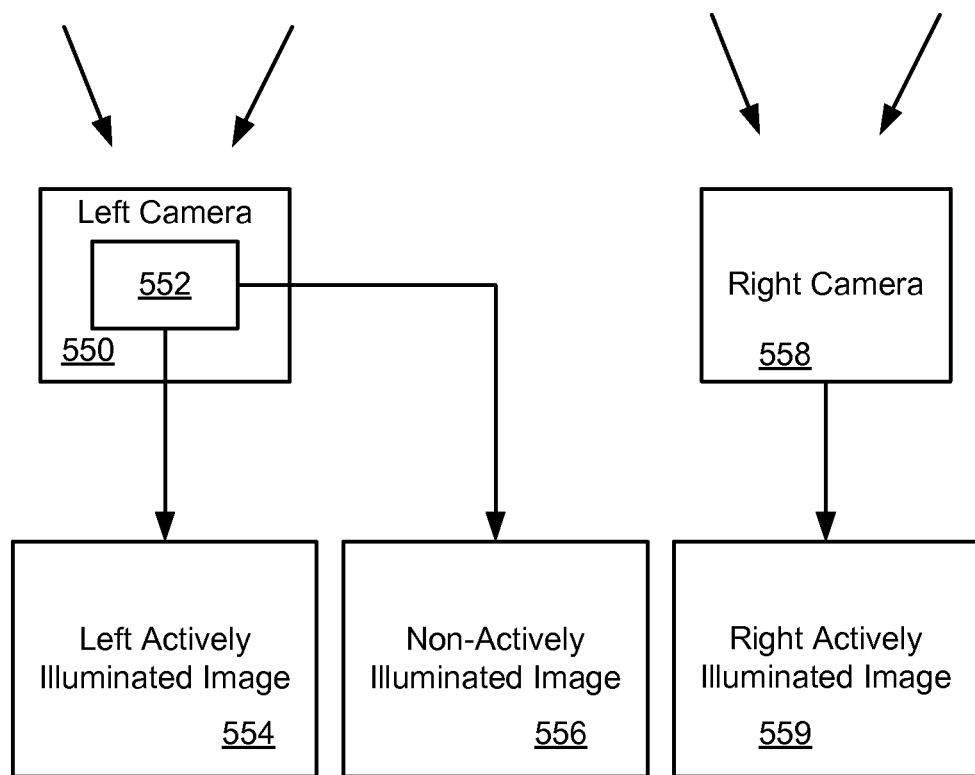
FIG. 5 is a representation of cameras that capture actively illuminated stereo images and a non-actively illuminated image, in which one camera produces one of the actively illuminated stereo images and the non-actively illuminated image, according to one or more example implementations.

As another alternative, an optical path may be the same for an actively illuminated image and a non-actively illuminated image by having one camera configured with optics/filtering to provide separate images. Thus, instead of the third camera being a separate physical device that captures images from a different viewpoint relative to one or both cameras of the stereo pair, a "third" camera may be integrated into one of the stereo cameras such that differently illuminated images are captured from the same viewpoint. For example, as in FIG. 5, one of the stereo cameras (e.g., the left camera 550) may include a mechanism 552 for splitting the incoming light between two sensors, with each sensor having a different spectral response, thereby producing the two images (one image 554 with and one image 556 without the active illumination) for use in matching with the other (e.g., right camera 558) image 559.

Alternatively, the mechanism 552 represents that one of the stereo cameras has a Bayer pattern on the pixels whereby some pixels receive light that includes the active illumination, and others do not. From such a single sensor it is possible to produce the two images (one image 554 with and one image 556 without the active illumination) for use in matching with the other (e.g., right camera 558) image 559.

Figure 6:
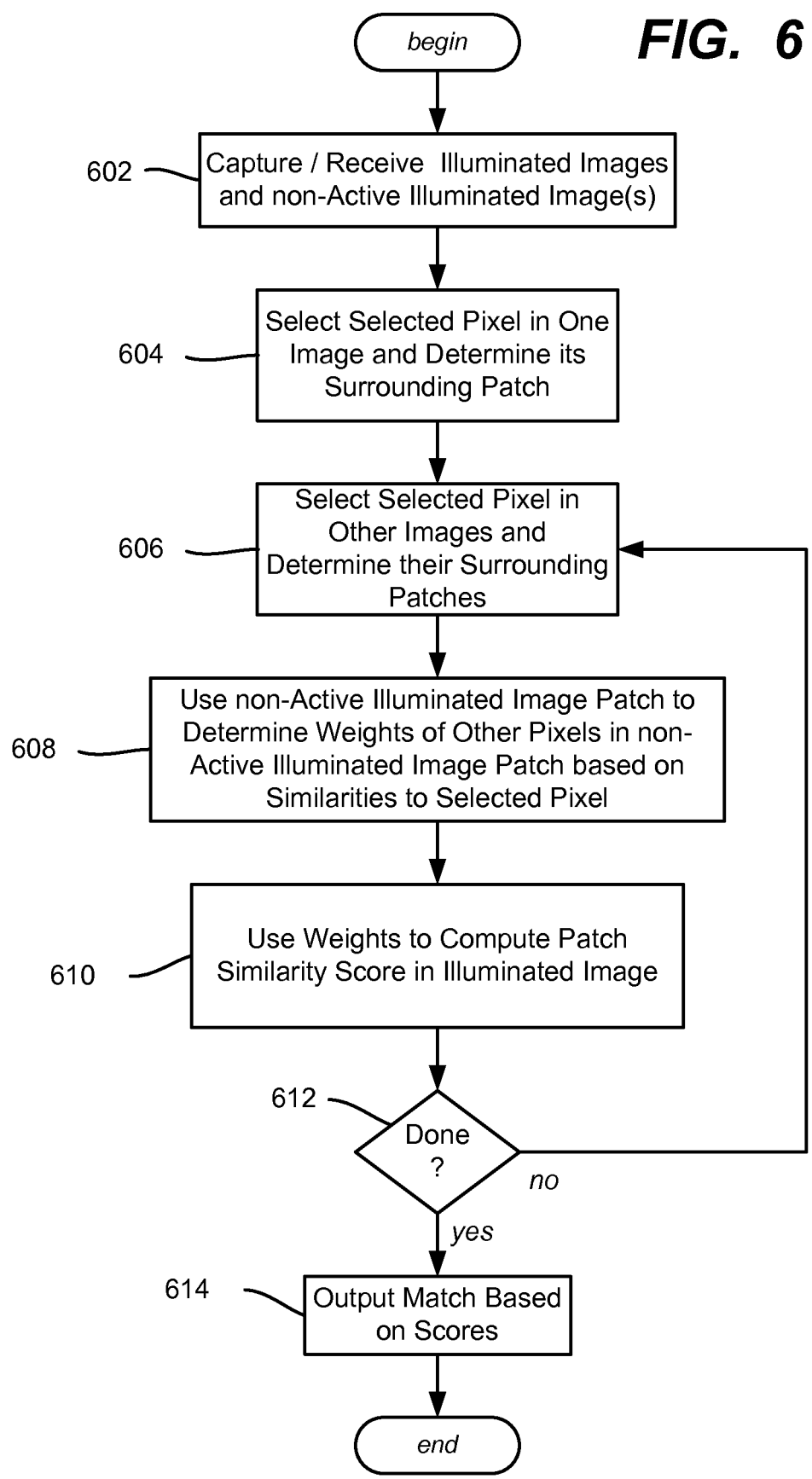
FIG. 6 is a flow diagram representing example steps directed towards using weights from a non-actively illuminated image to process actively illuminated stereo images, according to one or more example implementations.

FIG. 6 summarizes general aspects with respect to extracting weights from a third image as described herein, beginning at step 602 where the images are captured, e.g., using any of the techniques described above. Step 604 selects the reference pixel, e.g., in the left image, and determines its surrounding patch. Step 606 selects a counterpart pixel/patch in the other two images, e.g., as part of scanning along a line in the right image, and determining the pixel in the non-actively illuminated image based on the reference pixel and the pixel selected for evaluation.

Using the patch in the non-actively illuminated image, in step 608, the weights are determined, e.g., based upon color similarities of other pixels in the patch with the central pixel. These weights are used in step 610 to compute a patch similarity score between the actively illuminated images.

Step 612 repeats the process (e.g., linearly scanning pixels) until the patch-based similarity scores are obtained for pixels that may match. The highest score may be used to determine the pixel that matches the reference pixel, which is output as part of the matched pair at step 614.

Note that while color similarity is used as one measure for determining relative weights, other types of similarity may be used. For example, other captured data may include texture data. As one example, texture may be used as a measure to determine possible similarity, using large patches. If not sufficiently similar, a new pixel/patch is chosen as a candidate for matching, and so on. However, if sufficiently similar, a zoomed-in patch may be used, such as for color similarity to determine weights as described herein. This may increase accuracy in pixel matching, at the cost of larger patch processing and multiple-stage patch matching.

Example Operating Environment

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

Figure 7:
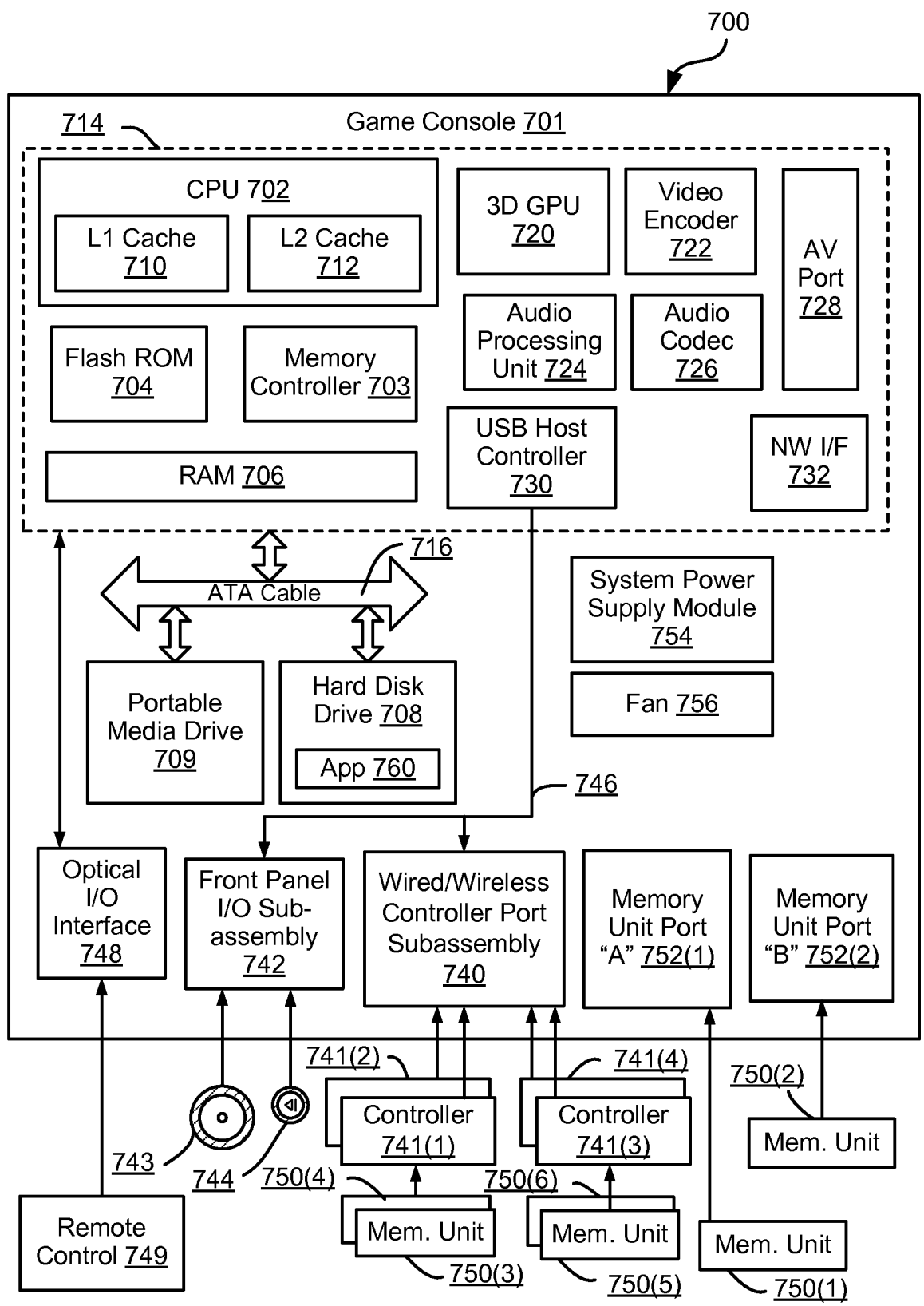
FIG. 7 is a block diagram representing an exemplary non-limiting computing system or operating environment, in the form of a gaming system, into which one or more aspects of various embodiments described herein can be implemented.

FIG. 7 is a functional block diagram of an example gaming and media system 700 and shows functional components in more detail. Console 701 has a central processing unit (CPU) 702, and a memory controller 703 that facilitates processor access to various types of memory, including a flash Read Only Memory (ROM) 704, a Random Access Memory (RAM) 706, a hard disk drive 708, and portable media drive 709. In one implementation, the CPU 702 includes a level 1 cache 710, and a level 2 cache 712 to temporarily store data and hence reduce the number of memory access cycles made to the hard drive, thereby improving processing speed and throughput.

The CPU 702, the memory controller 703, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 702, the memory controller 703, the ROM 704, and the RAM 706 are integrated onto a common module 714. In this implementation, the ROM 704 is configured as a flash ROM that is connected to the memory controller 703 via a Peripheral Component Interconnect (PCI) bus or the like and a ROM bus or the like (neither of which are shown). The RAM 706 may be configured as multiple Double Data Rate Synchronous Dynamic RAM (DDR SDRAM) modules that are independently controlled by the memory controller 703 via separate buses (not shown). The hard disk drive 708 and the portable media drive 709 are shown connected to the memory controller 703 via the PCI bus and an AT Attachment (ATA) bus 716. However, in other implementations, dedicated data bus structures of different types can also be applied in the alternative.

A three-dimensional graphics processing unit 720 and a video encoder 722 form a video processing pipeline for high speed and high resolution (e.g., High Definition) graphics processing. Data are carried from the graphics processing unit 720 to the video encoder 722 via a digital video bus (not shown). An audio processing unit 724 and an audio codec (coder/decoder) 726 form a corresponding audio processing pipeline for multi-channel audio processing of various digital audio formats. Audio data are carried between the audio processing unit 724 and the audio codec 726 via a communication link (not shown). The video and audio processing pipelines output data to an A/V (audio/video) port 728 for transmission to a television or other display/speakers. In the illustrated implementation, the video and audio processing components 720, 722, 724, 726 and 728 are mounted on the module 714.

FIG. 7 shows the module 714 including a USB host controller 730 and a network interface (NW I/F) 732, which may include wired and/or wireless components. The USB host controller 730 is shown in communication with the CPU 702 and the memory controller 703 via a bus (e.g., PCI bus) and serves as host for peripheral controllers. The network interface 732 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 7, the console 701 includes a controller support subassembly 740, for supporting four game controllers 741(1)-741(4). The controller support subassembly 740 includes any hardware and software components needed to support wired and/or wireless operation with an external control device, such as for example, a media and game controller. A front panel I/O subassembly 742 supports the multiple functionalities of a power button 743, an eject button 744, as well as any other buttons and any LEDs (light emitting diodes) or other indicators exposed on the outer surface of the console 701. The subassemblies 740 and 742 are in communication with the module 714 via one or more cable assemblies 746 or the like. In other implementations, the console 701 can include additional controller subassemblies. The illustrated implementation also shows an optical I/O interface 748 that is configured to send and receive signals (e.g., from a remote control 749) that can be communicated to the module 714.

Memory units (MUs) 750(1) and 750(2) are illustrated as being connectable to MU ports "A" 752(1) and "B" 752(2), respectively. Each MU 750(1), 750(2), 750(3), 750(4), 750(5), and 750(6) offers additional storage on which games, game parameters, and other data may be stored. In some implementations, the other data can include one or more of a digital game component, an executable gaming application, an instruction set for expanding a gaming application, and a media file. When inserted into the console 701, each MU 750 can be accessed by the memory controller 703.

A system power supply module 754 provides power to the components of the gaming system 700. A fan 756 cools the circuitry within the console 701.

An application 760 comprising machine instructions is typically stored on the hard disk drive 708. When the console 701 is powered on, various portions of the application 760 are loaded into the RAM 706, and/or the caches 710 and 712, for execution on the CPU 702. In general, the application 760 can include one or more program modules for performing various display functions, such as controlling dialog screens for presentation on a display (e.g., high definition monitor), controlling transactions based on user inputs and controlling data transmission and reception between the console 701 and externally connected devices.

The gaming system 700 may be operated as a standalone system by connecting the system to high definition monitor, a television, a video projector, or other display device. In this standalone mode, the gaming system 700 enables one or more players to play games, or enjoy digital media, e.g., by watching movies, or listening to music. However, with the integration of broadband connectivity made available through the network interface 732, gaming system 700 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
processing a plurality of images including a first image, a second image, and a third image, wherein the first image and the second image are actively illuminated stereo images, and the third image is a non-actively illuminated image;
determining a first patch in the first image based on a location of a first pixel of interest, the first patch comprising a first plurality of pixels surrounding the first pixel of interest;
determining a second patch in the second image based on a location of a second pixel corresponding to the first pixel, the second patch comprising a second plurality of pixels surrounding the second pixel;
determining a third patch in the third image based on a location of a third pixel corresponding to at least one of the first pixel and the second pixel, the third patch comprising a third plurality of pixels surrounding the third pixel; and
optimizing a similarity score between the first patch and the second patch in the actively illuminated stereo images by:
determining weights for the third plurality of pixels in the third patch in the third image based upon a similarity between the third pixel and respective pixels in the third plurality of pixels; and
using the weights of the third plurality of pixels in the third patch to determine the similarity score between the first patch and the second patch in the actively illuminated stereo images.

2. The method of claim 1, wherein the plurality of images are of a scene actively illuminated with infrared light in a part of an infrared spectrum, and wherein capturing the non-actively illuminated image includes using a notch filter to capture the scene with the part of the infrared spectrum that contains the active illumination removed.

3. The method of claim 1, wherein capturing the plurality of images comprises capturing one actively illuminated stereo image and the non-actively illuminated image active via same optical path.

4. The method of claim 1, wherein capturing the plurality of images comprises using one camera to capture one actively illuminated stereo image in one frame and using a second camera to capture the non-actively illuminated image in another frame.

5. The method of claim 1 further comprising using the weights to determine similarity via an adaptive support weights algorithm.

6. A system comprising:
an image processing component comprising a matching algorithm; and
image capturing component that captures a plurality of images including actively illuminated stereo images and a non-actively illuminated image,
wherein the image processing component is configured to:
determine a first patch for the non-actively illuminated image based on a location of a first pixel in a first image;
determine a second patch for a first actively illuminated stereo image based on a location of a second pixel in the first actively illuminated stereo image, the second pixel corresponding to the first pixel;
determine a third patch for a second actively illuminated stereo image based on a location of a third pixel in the second actively illuminated stereo image, the third pixel corresponding to one of the first pixel and the second pixel; and
optimize a similarity score between the second patch and the third patch in the actively illuminated stereo images by:
processing the first, second, and third patch using the matching algorithm, the matching algorithm configured to process the first patch in the non-actively illuminated image to determine weights corresponding to pixels in the first patch, and to use the weights determined in the non-actively illuminated image to determine similarity between the second and third patches in the first and second actively illuminated stereo images.

7. The system of claim 6, wherein the matching algorithm linearly scans pixels in at least one of the actively illuminated images to look for matching pixels based upon patch similarity.

8. The system of claim 6, wherein the matching algorithm is further configured to determine matching pixel data, and wherein the matching algorithm is coupled to or incorporates a depth processing algorithm that processes the matching pixel data to generate a depth map.

9. The system of claim 6, wherein the actively illuminated stereo images comprise infrared (IR) images, and wherein the non-actively illuminated image comprises a red, green and blue (RGB) image.

10. The system of claim 6, wherein the actively illuminated stereo images comprise RGB images, and wherein the non-actively illuminated image comprises an IR image.

11. The system of claim 6, wherein the actively illuminated stereo images comprise IR images, and wherein the non-actively illuminated image comprises an IR image filtered with a notch filter that removed active illumination.

12. The system of claim 6, wherein the image capturing component comprises a device including a plurality of cameras and an active illumination projector.

13. The system of claim 6, wherein the matching algorithm uses the weights to determine similarity via an adaptive support weights algorithm.

14. The system of claim 6, wherein the image capturing component includes two cameras that share an optical path via reflection, wherein one of the two cameras captures one of the actively illuminated stereo images, and the other of the two cameras captures the non-actively illuminated image.

15. The system of claim 6, wherein the image capturing component includes one camera that captures one of the actively illuminated stereo images and the non-actively illuminated image.

16. The system of claim 15, wherein the camera includes a splitter mechanism configured to split incoming light into one of the actively illuminated stereo images and the non-actively illuminated image.

17. The system of claim 15, wherein the camera includes a Bayer pattern on sensed pixels to receive light that includes the active illumination on one subset of pixels and receive light that does not include the active illumination on another subset of pixels.

18. One or more computer-readable memory devices having executable instructions, that when executed by a processor, cause the processor to perform operations, comprising:

receiving actively illuminated stereo infrared (IR) images;

receiving a non-actively illuminated image;

determining a first patch in the non-actively illuminated image based on a location of a first pixel in the non-actively illuminated image;

determining a second patch in a first actively illuminated stereo IR image based on a location of a second pixel in the first actively illuminated stereo IR image, the second pixel corresponding to the first pixel;

determining a third patch in a second actively illuminated stereo IR image based on a location of a third pixel in the second actively illuminated stereo IR image, the third pixel corresponding to one of the first pixel and the second pixel; and optimizing a similarity score between the second patch and the third patch in the actively illuminated stereo images by:

obtaining adaptive support weights for the first patch in the non-actively illuminated image; and using the adaptive support weights in an active support weights computation to determine similarity of the second patch and the third patch.

19. The method of claim 1, wherein the similarity score is based on texture data corresponding to the first patch and the second patch, and wherein the weights of the third plurality of pixels are based on color similarities.

20. The method of claim 1, wherein using the weights of the third plurality of pixels in the third patch to determine the similarity score comprises using the weights of the third plurality of pixels in the third patch to determine a similarity score between a weighted match score associated with the first patch and a weighted match score associated with the second patch in the actively illuminated stereo images.

* * * * *